(12) United States Patent
Sartori et al.

(10) Patent No.: US 10,667,239 B2
(45) Date of Patent: May 26, 2020

(54) METHOD FOR RESOURCE SELECTION

(71) Applicant: Futurewei Technologies, Inc., Plano, TX (US)

(72) Inventors: Philippe Sartori, Algonquin, IL (US); Yi Shi, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/917,358

(22) Filed: Mar. 9, 2018

(65) Prior Publication Data

US 2019/0082421 A1 Mar. 14, 2019

Related U.S. Application Data

(60) Provisional application No. 62/469,833, filed on Mar. 10, 2017.

(51) Int. Cl.
*H04W 72/02* (2009.01)
*H04W 74/08* (2009.01)
(Continued)

(52) U.S. Cl.
CPC .......... *H04W 72/02* (2013.01); *H04W 36/06* (2013.01); *H04W 48/16* (2013.01); *H04W 72/0446* (2013.01); *H04W 74/0808* (2013.01)

(58) Field of Classification Search
CPC .......... H04L 2012/5608; H04W 84/12; H04W 88/08; H04W 80/04; H04W 88/06;
(Continued)

(56) References Cited

U.S. PATENT DOCUMENTS

2014/0198742 A1* 7/2014 Baldemair ........ H04W 74/0833
370/329
2015/0271841 A1* 9/2015 Yamada ............ H04W 56/0045
370/329
(Continued)

FOREIGN PATENT DOCUMENTS

CN 104080176 A 10/2014
CN 105657842 A 6/2016
(Continued)

OTHER PUBLICATIONS

LG Electronics "LTE-based V2X Services", 3GPP TSG RAN Meeting #73, RP-161894, Sep. 19-22, 2016, 10 pgs.
(Continued)

*Primary Examiner* — Brenda H Pham
(74) *Attorney, Agent, or Firm* — Slater Matsil, LLP

(57) ABSTRACT

A method for resource selection is disclosed. The method includes performing, by a UE, a first sensing operation to determine available resources in a resource pool; transmitting, by the UE, first data using a first set of available resources, the first set of available resources having been selected from the resource pool in accordance with the first sensing operation; performing, by the UE, concurrently with the first sensing operation and resource selection of the first set of available resources and independently from the first sensing operation, a second sensing operation to determine other available resources in the resource pool; and transmitting, by the UE, second data using a second set of available resources, the second set of available resources having been selected from the resource pool in accordance with the second sensing operation, wherein the first set of available resources and the second set of available resources are independently selected.

23 Claims, 7 Drawing Sheets

(51) Int. Cl.
  *H04W 36/06* (2009.01)
  *H04W 48/16* (2009.01)
  *H04W 72/04* (2009.01)

(58) Field of Classification Search
  CPC ..... H04W 84/18; H04W 36/30; H04W 36/24; H04W 74/08; H04W 8/26; H04B 7/2123; H04B 7/212
  USPC .... 370/310.2, 328, 338, 322, 329, 330, 341, 370/348, 332, 349
  See application file for complete search history.

(56) References Cited

U.S. PATENT DOCUMENTS

| | | | |
|---|---|---|---|
| 2016/0073408 A1* | 3/2016 | Sartori | H04W 72/0453 370/329 |
| 2017/0006594 A1 | 1/2017 | Wei | |
| 2017/0188391 A1* | 6/2017 | Rajagopal | H04W 74/0816 |
| 2018/0249444 A1* | 8/2018 | Sorrentino | H04W 72/02 |
| 2018/0310297 A1* | 10/2018 | Martin | H04W 4/70 |
| 2019/0075546 A1* | 3/2019 | Yasukawa | H04W 72/02 |
| 2019/0075548 A1* | 3/2019 | Lee | H04W 72/02 |
| 2019/0090250 A1* | 3/2019 | Lee | H04W 72/02 |
| 2019/0182827 A1* | 6/2019 | Wang | H04W 72/1278 |

FOREIGN PATENT DOCUMENTS

| | | |
|---|---|---|
| CN | 106028386 A | 10/2016 |
| CN | 106257958 A | 12/2016 |
| EP | 3319381 A1 | 5/2018 |
| WO | 2017007184 A1 | 1/2017 |
| WO | 2017008227 A1 | 1/2017 |

OTHER PUBLICATIONS

LG Electronics "LTE-based V2X Services", 3GPP TSG RAN Meeting #73 (Revised), RP-161894, Sep. 19-22, 2016, 10 pgs.

Huawei et al., "Discussion on the P-UE resource selection", 3GPP TSG RAN WG1 Meeting #86, R1-166205, Aug. 22-26, 2016, 4 Pages, Gothenburg, Sweden.

Intel Corporation, "Remaining details of partial sensing for P2V communication", 3GPP TSG RAN WG1 Meeting #88, R1-1702141, Feb. 13-17, 2017, 8 Pages, Athens, Greece.

3rd Generation Partnership Project; Technical Specification Group Radio Access Network; Evolved Universal Terrestrial Radio Access (E-UTRA); Physical layer procedures (Release 14), 3GPP TS 36.213, Sep. 2016, 406 Pages, V14.0.0.

3rd Generation Partnership Project; Technical Specification Group Radio Access Network; Evolved Universal Terrestrial Radio Access (E-UTRA); Radio Resource Control (RRC); Protocol specification (Release 14), 3GPP TS 36.331, Sep. 2016, 524 Pages, V14.0.0.

* cited by examiner

```
-- ASN1START
SystemInformationBlockType21-r14 ::= SEQUENCE {
    sl-V2X-ConfigCommon-r14      SL-V2X-ConfigCommon-r14      OPTIONAL,    -- Need OR
    lateNonCriticalExtension     OCTET STRING                 OPTIONAL,
    ...
}

SL-V2X-ConfigCommon-r14 ::=    SEQUENCE {
    v2x-CommRxPool-r14                    SL-CommRxPoolListV2X-r14             OPTIONAL,    --
Need OR
    v2x-CommTxPoolNormalCommon-r14        SL-CommTxPoolListV2X-r14             OPTIONAL,    --
Need OR
    v2x-CommTxPoolExceptional-r14         SL-CommResourcePoolV2X-r14           OPTIONAL,    --
Need OR
    v2x-SyncConfig-r14                    SL-SyncConfigListV2X-r14             OPTIONAL,    --
Need OR
    v2x-InterFreqInfoList-r14             SL-InterFreqInfoListV2X-r14          OPTIONAL,    --
Need OR
    v2x-ResourceSelectionConfig-r14       SL-CommTxPoolSensingConfig-r14       OPTIONAL,
    -- Need OR
    zoneConfig-r14                        SL-ZoneConfig-r14                    OPTIONAL     --
Need OR
}

SL-CommTxPoolSensingConfig-r14 ::=   SEQUENCE {
    pssch-TxConfigList-r14           SL-PSSCH-TxConfigList-r14,
    thresPSSCH-RSRP-List-r14         SL-ThresPSSCH-RSRP-List-r14,
    restrictResourceReservationPeriod-r14    BIT STRING (SIZE (10)),
    probResourceKeep-r14             ENUMERATED {v0, v0dot2, v0dot4, v0dot6, v0dot8,
                                                 spare3,spare2, spare1}
}

SI-XXXXX-R15
-- ASN1STOP
```

FIG. 7

METHOD FOR RESOURCE SELECTION

CROSS-REFERENCE TO RELATED APPLICATIONS

This application claims the benefit of U.S. Provisional Application No. 62/469,833, filed on Mar. 10, 2017, which application is hereby incorporated herein by reference.

TECHNICAL FIELD

The present disclosure relates generally to a system and method for selecting resources and, in particular embodiments, to a system and method for improved transmission reliability between user equipment in V2V/V2X technology.

BACKGROUND

Vehicle-to-Vehicle (V2V) and Vehicle-to-Everything (V2X) technologies have been standardized by the 3rd Generation Partnership Project (3GPP) in Release 14 (Rel-14). V2V/V2X services are supported on the sidelink and reuse much of the Device-to-Device (D2D) work already standardized in Rel-12 and Rel-13. The term "sidelink" refers to communication performed between one user equipment (UE) and one or more other UEs without data being transmitted through an Evolved Node B (eNB) or other centralized controller. In particular, V2V/V2X messages are broadcast by a source without a priori knowledge of a receiver.

In Rel-15, the V2V/V2X work is expected to continue for both Long Term Evolution (LTE) and New Radio (NR) Scalable Network. In particular, it is likely that more advanced vehicular services such as platooning, automated merging, and a general move towards autonomous cars will be standardized. The work has already started in the 3GPP Service and System Aspects Group 1 (SA1), where requirements for V2V/V2X services are being drafted.

One of the requirements for advanced V2V/V2X services is the need for higher transmission reliability, for both multicast and unicast transmission. With transmission mode-4 (UE being autonomous without eNB allocating resources), the Rel-14 V2V/V2X solution might not provide adequate reliability. Thus, there is a need for techniques for improved mode-4 reliability.

SUMMARY

In accordance with an embodiment of the present disclosure, a method for resource selection comprises performing, by a UE, a first sensing operation to determine available resources in a resource pool; transmitting, by the UE, first data using a first set of available resources, the first set of available resources having been selected from the resource pool in accordance with the first sensing operation; performing, by the UE, concurrently with the first sensing operation and resource selection of the first set of available resources and independently from the first sensing operation, a second sensing operation to determine other available resources in the resource pool; and transmitting, by the UE, second data using a second set of available resources, the second set of available resources having been selected from the resource pool in accordance with the second sensing operation, wherein the first set of available resources and the second set of available resources are independently selected.

In the previous embodiment, the first data and the second data might be the same data. In any of the previous embodiments, the first data and the second data might be two consecutive data packets. In any of the previous embodiments, the first set of available resources and the second set of available resources might be selected on different subframes. In any of the previous embodiments, the first set of available resources might be used in odd resource intervals and the second set of available resources might be used in even resource intervals. In any of the previous embodiments, the first set of available resources and the second set of available resources might be used in the same resource interval. In any of the previous embodiments, selection of the first set of available resources and selection of the second set of available resources might be performed before a reselection of resources. In any of the previous embodiments, resource reselections for the first set of available resources and the second set of available resources might occur at different times. In any of the previous embodiments, the first set of available resources and the second set of available resources might be in consecutive data blocks. In any of the previous embodiments, the method might further comprise performing, by the UE, concurrently with the first sensing operation and the second sensing operation and independently from the first sensing operation and the second sensing operation, a third sensing operation to determine additional other available resources in the resource pool; and transmitting, by the UE, third data using a third set of available resources, the third set of available resources having been selected from the resource pool in accordance with the third sensing operation. In any of the previous embodiments, the first sensing operation and the second sensing operation might comprise sidelink mode-4 sensing operations.

In accordance with another embodiment of the present disclosure, a UE comprises a transmitter configured to transmit first data using a first set of available resources, the first set of available resources having been selected from the resource pool in accordance with a first sensing operation performed by the UE to determine available resources in a resource pool. The transmitter is further configured to transmit second data using a second set of available resources, the second set of available resources having been selected from the resource pool in accordance with a second sensing operation performed by the UE, concurrently with the first sensing operation and resource selection of the first set of available resources and independently from the first sensing operation, to determine other available resources in the resource pool, wherein the first set of available resources and the second set of available resources are independently selected.

In the previous embodiment, the first data and the second data might be the same data. In any of the previous embodiments, the first data and the second data might be two consecutive data packets. In any of the previous embodiments, the first set of available resources and the second set of available resources might be selected on different subframes. In any of the previous embodiments, the first set of available resources might be used in odd resource intervals and the second set of available resources might be used in even resource intervals. In any of the previous embodiments, the first set of available resources and the second set of available resources might be used in the same resource interval. In any of the previous embodiments, selection of the first set of available resources and selection of the second set of available resources might be performed before a reselection of resources. In any of the previous embodiments, resource reselections for the first set of available resources and the second set of available resources might occur at different times. In any of the previous embodiments, the first set of available resources and the second set of available resources might be in consecutive data blocks. In any of the previous embodiments, the transmitter might be configured to transmit third data using a third set of available resources, the third set of available resources having been selected from the resource pool in accordance with a third sensing operation performed, concurrently with the first sensing operation and the second sensing operation and independently from the first sensing operation and the second sensing operation, to determine additional other available resources in the resource pool. In any of the previous embodiments, the first sensing operation and the second sensing operation might comprise sidelink mode-4 sensing operations.

In accordance with another embodiment of the present disclosure, a device comprises a non-transitory memory storage comprising instructions and one or more processors in communication with the memory storage. The one or more processors execute the instructions to transmit first data using a first set of available resources, the first set of available resources having been selected from the resource pool in accordance with a first sensing operation performed by the device to determine available resources in a resource pool, and transmit second data using a second set of available resources, the second set of available resources having been selected from the resource pool in accordance with a second sensing operation performed by the device, concurrently with the first sensing operation and resource selection of the first set of available resources and independently from the first sensing operation, to determine other available resources in the resource pool, wherein the first set of available resources and the second set of available resources are independently selected.

In the previous embodiment, the first data and the second data might be the same data. In any of the previous embodiments, the first data and the second data might be two consecutive data packets. In any of the previous embodiments, the first set of available resources and the second set of available resources might be selected on different subframes. In any of the previous embodiments, the first set of available resources might be used in odd resource intervals and the second set of available resources might be used in even resource intervals. In any of the previous embodiments, the first set of available resources and the second set of available resources might be used in the same resource interval. In any of the previous embodiments, selection of the first set of available resources and selection of the second set of available resources might be performed before a reselection of resources. In any of the previous embodiments, resource reselections for the first set of available resources and the second set of available resources might occur at different times. In any of the previous embodiments, the first set of available resources and the second set of available resources might be in consecutive data blocks. In any of the previous embodiments, the one or more processors might further execute the instructions to perform, concurrently with the first sensing operation and the second sensing operation and independently from the first sensing operation and the second sensing operation, a third sensing operation to determine additional other available resources in the resource pool; and transmit third data using a third set of available resources, the third set of available resources having been selected from the resource pool in accordance with the third sensing operation. In any of the previous embodiments, the first sensing operation and the second sensing operation might comprise sidelink mode-4 sensing operations.

An advantage of the disclosed embodiments is that the number of consecutive packet losses for V2X mode-4 transmissions might be decreased.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 7 illustrates the System Information Block 21;

DETAILED DESCRIPTION OF ILLUSTRATIVE EMBODIMENTS

Transmission mode-4 provides an autonomous resource selection process, wherein a UE autonomously selects time/frequency transmission resources from a V2X sidelink transmission resource pool to transmit a V2V or V2X message. While the embodiments disclosed herein are described with respect to LTE-based V2V/V2X transmission systems, the embodiments might also apply to NR-based V2V/V2X systems where UEs autonomously select resources using a resource selection process similar to mode-4, with a sensing phase. The embodiments might also apply when LTE V2V/V2X and NR V2V/V2X (and/or possibly another system) share the same band.

Figure 1:
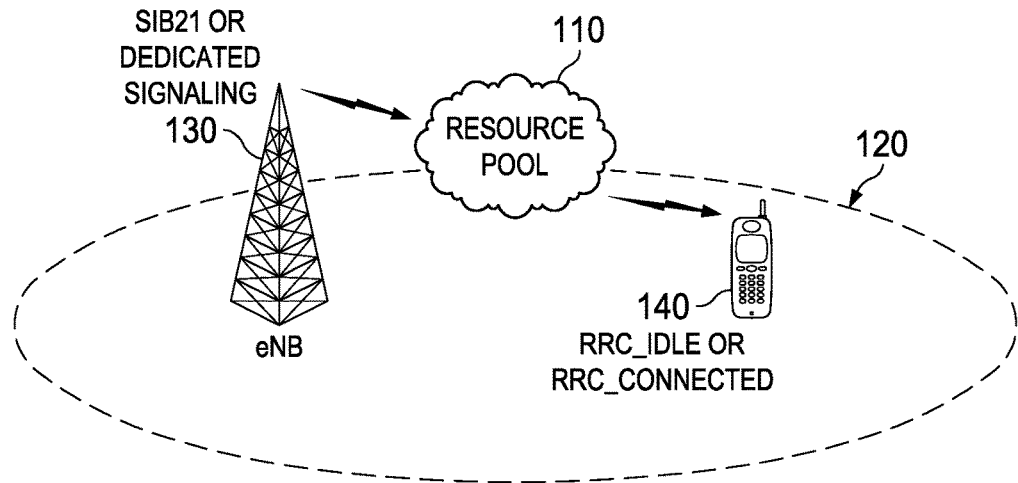
FIG. 1 is a diagram illustrating a mode-4 resource pool.

FIG. 1 illustrates an embodiment of a resource pool no with respect to a cell 120 of a base station, such as an eNB 130, and a UE 140. The resource pool 110 might be available for in-coverage UEs (i.e., UEs covered by the cell 120) and out-of-coverage UEs (i.e., UEs not covered by the cell 120). The resource pool 110 might be provided by the network through the eNB 130 (for in-coverage UEs) or by preconfiguration (for out-of-coverage UEs). The resource pool 110 might be available for idle UEs (RRC_IDLE) or for connected UEs (RRC_CONNECTED). If a mapping between the zones in the cell 120 and the V2X sidelink transmission resource pool 110 is configured, the UE 140 might select from the V2X sidelink resource pool 110 based on the zone where the UE 140 is located.

UEs, such as UEs in V2X vehicles, may be synchronized such that the UEs are able to sense and reserve periodic time/frequency resources in the sidelink transmission resource pool for V2X traffic. That is, a UE might observe data traffic in a cell and determine which resources in the resource pool are occupied and which resources are available. Such a procedure might be referred to as sensing. After performing a sensing operation, the UE might select available resources in the resource pool for its data transmissions.

However, it might happen that two UEs perform a sensing operation at approximately the same time, discover at approximately the same time that the same resources are available, and select those same resources at approximately the same time for their data transmissions. In such a case, the UEs will collide until one of the two UEs reselects the resources or until the distance between the two UEs is sufficiently large. Such processes might take several seconds. If the UEs broadcast data under mode-4 transmission, there is no feedback, and the transmitting UEs are not aware of the collisions. Given that resource reselection is a relatively rare occurrence, a receiving UE might be prevented from receiving data packets from one or more transmitting UEs for a large number of transmissions of consecutive data packets, as illustrated in FIG. 2.

Figure 2:
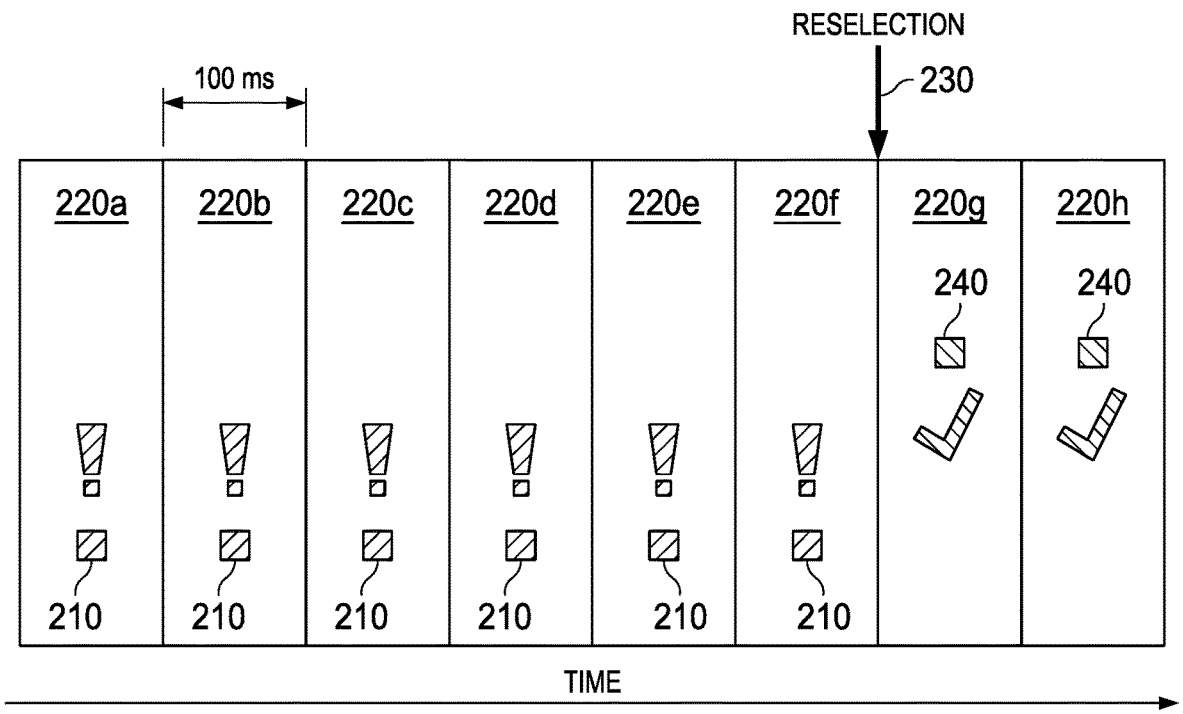
FIG. 2 is a diagram illustrating selected resources in resource intervals of a resource pool.

In FIG. 2, data is semi-persistently transmitted on a resource 210 in a plurality of intervals 220. The length of a resource interval 220 typically is 100 milliseconds (ms) but might be different. In this example, collisions occur in the first six intervals 220a-220f, and thus transmission failures occur in those intervals 220a-220f. (The failures are marked with exclamation marks in FIG. 2.) That is, as described above, if a transmission by a UE on a resource collides with a transmission by another UE, a receiving UE is not able to receive data from the transmitting UEs. The selected resource 210 remains the same until a reselection 230 is triggered and another resource 240 is selected. The reselection 230 is a procedure whereby a UE occasionally chooses a different set of transmission resources to introduce randomness and adaptation to a changing environment. Reselection might be automatically triggered after a defined length of time or after a defined number of transmissions. After the reselection 230, the transmitting UE is able to transmit its data via the reselected resources 240, and the receiving UE might be able to receive the data because no other UE is transmitting data on those resources. (Successful transmission is marked with check marks in FIG. 2.)

Figure 3:
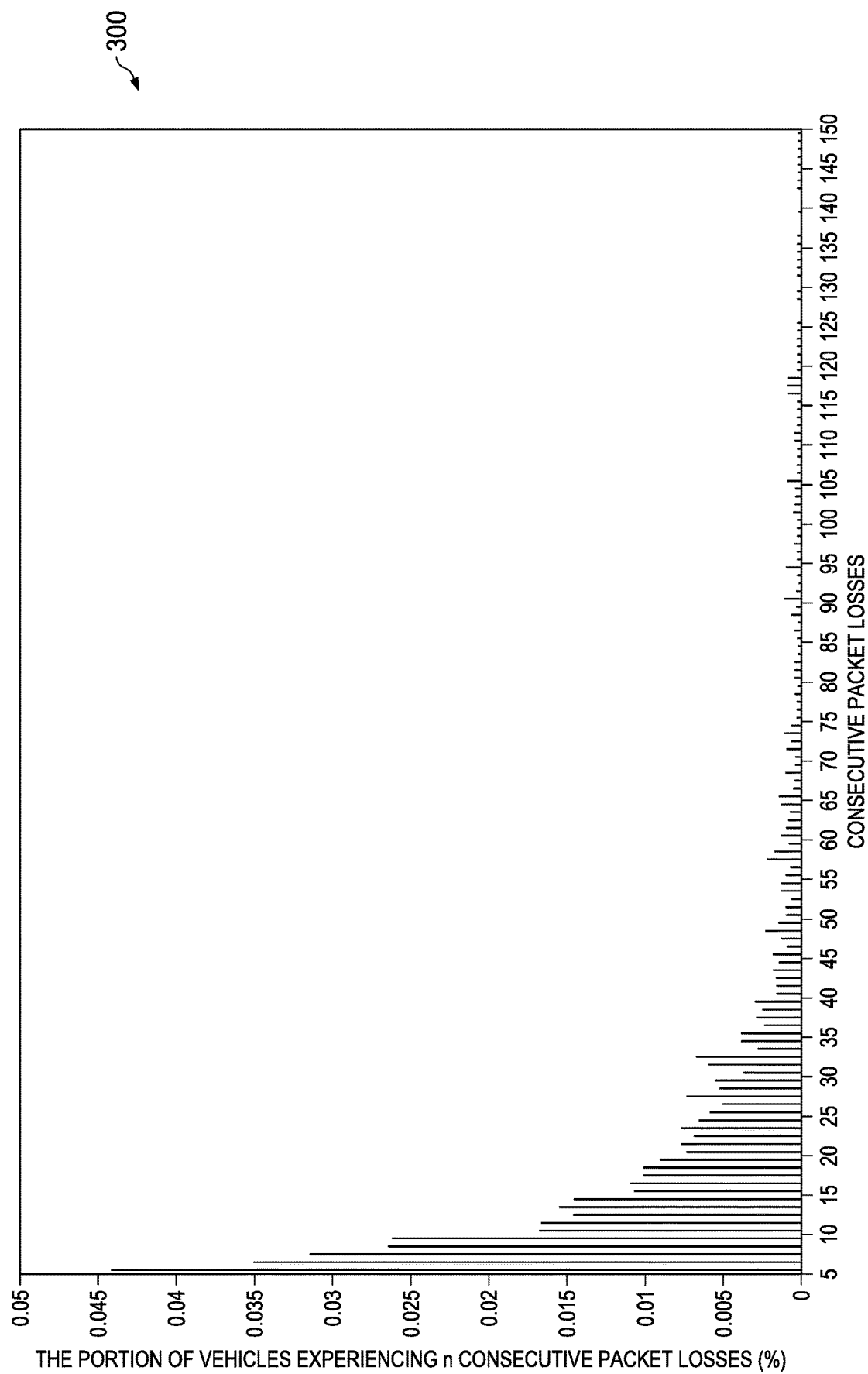
FIG. 3 is a diagram illustrating receiving UEs experiencing consecutive packet losses.

In an exemplary case, the fraction of receiving UEs experiencing n consecutive packet losses is shown in the diagram 300 of FIG. 3. As is apparent, the fraction of receiving UEs experiencing consecutive packet losses is significant. For instance, more than 2% of vehicles experience at least 10 consecutive packet losses. It is noted that, depending on parameters, the proportion of UEs experiencing consecutive packet losses can be much larger (e.g., for shorter interval periodicities, e.g., 20 ms). The number of consecutive packet losses might be too large for the advanced connected vehicle services being considered for $5^{th}$ Generation (5G) systems. Therefore, there is a need for a solution to lower the number of consecutive packet losses for V2X mode-4.

Embodiments of the present disclosure provide at least one solution to this need. In an embodiment, a UE concurrently performs at least two independent mode-4 resource selection procedures, $S_1$ and $S_2$. The UE might select resources according to a resource selection procedure $S_1$ on odd subframes, and the UE might select resources according to a resource selection procedure $S_2$ on even subframes. The resource selection procedures $S_1$ and $S_2$ run independently (except for some possible rules to prevent self-collision, such as preventing the resource selection procedures $S_1$ and $S_2$ from selecting resources on the same subframe). That is, the resources selected by the $S_1$ and $S_2$ procedures are different from one another, and the resource reselection times may be different.

By using two independent sensing and selection procedures or methods, "resource selection diversity" can be achieved. If the probability of two UEs colliding on a given resource interval is 1/N, the probability of two UEs colliding for two consecutive transmissions is $1/N^2$ for the same two UEs.

Figure 4:
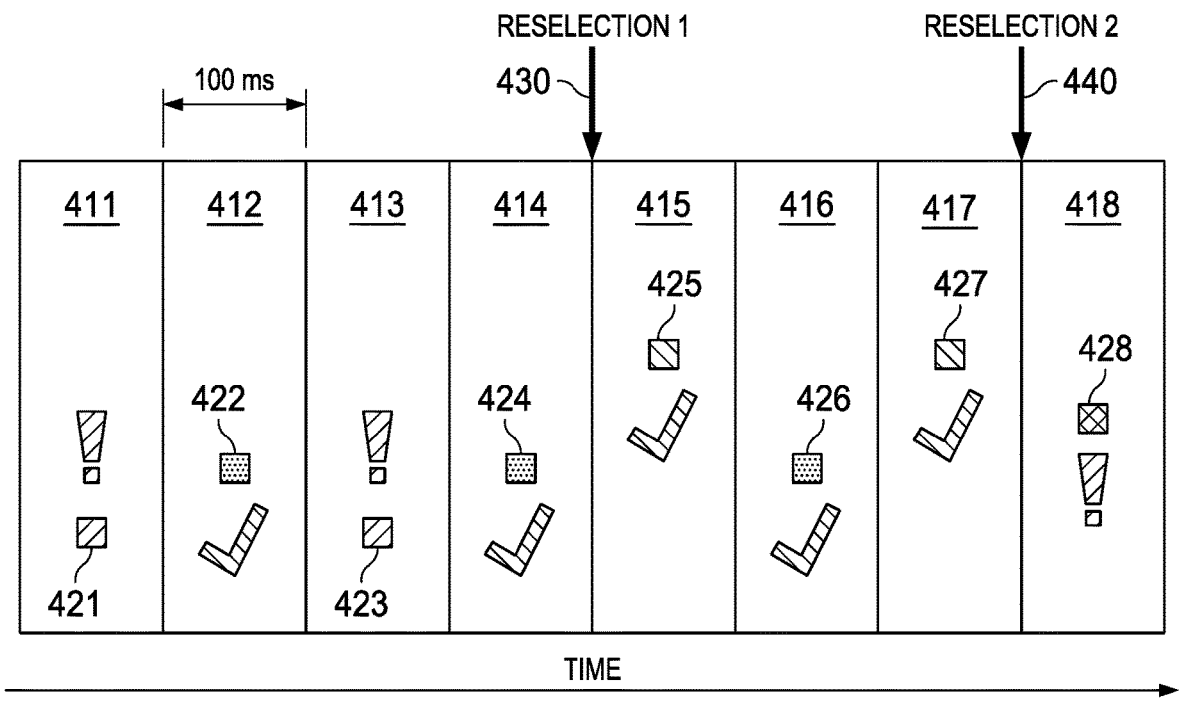
FIG. 4 is a diagram illustrating selected resources in two different resource intervals of a resource pool according to two embodiment independent resource selection processes.
Figure 5:
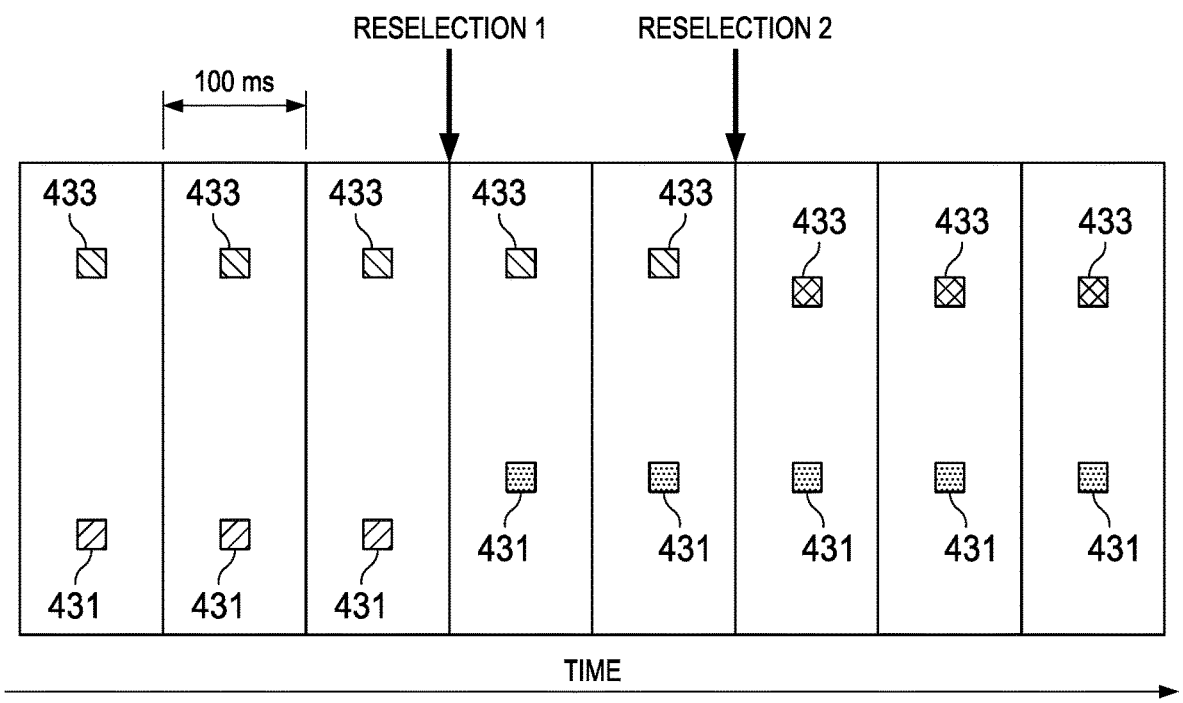
FIG. 5 is a diagram illustrating two different selected resources in the same resource intervals of a resource pool according to two embodiment independent resource selection processes.

Embodiments of sensing and selection methods are shown in FIGS. 4 and 5. The embodiment of FIG. 4 shows eight resource intervals 411-418. A first transmitting UE selects, according to a first selection procedure $S_1$, resources 421, 423 in odd resource intervals 411, 413 and transmits data on those resources 421, 423. In this example, the selected resources 421, 423 are also selected, by coincidence, by a second transmitting UE that also attempts to transmit its data on those resources 421, 423. Because of this collision, a receiving UE will not receive any data from the transmitting UEs. (The failure is marked with exclamation marks in FIG. 4.) However, the first transmitting UE has also selected, according to a second selection procedure $S_2$, resources 422, 424 in even resource intervals 412, 414 and transmits the same data on those resources 422, 424 that was transmitted in resources 421, 423. In this example, the selected resources 422, 424 are not selected by the second transmitting UE to transmit its data, so the receiving UE receives the data from the first transmitting UE on resources 422, 424. (Successful transmission is marked with check marks in FIG. 4.) It should be understood that terms such as "first" and "second" are used herein to differentiate UEs from one another and do not imply any sort of sequence.

Assuming that the data blocks allocated to the resources 421-424 are consecutive data blocks, the receiving UE at least receives every other data block. Moreover, as can be seen from FIG. 4, after reselection 430 in the first selection procedure $S_1$, the data blocks are transmitted on the resources 425-427 of the odd and the even resource intervals 415-417. After reselection 440 in the second selection procedure $S_2$, the data blocks on the resource 428 of the even interval 418 cannot reach the receiving UE, but the data blocks on the resources 425, 427 of the odd resource intervals 415, 417 can still be received by the receiving UE. It may be noted that the same data is transmitted on different resources, such as on resource 421 and resource 422, before any reselection operation 430 or 440 is performed.

The length of the resource interval may be 100 ms as indicated in FIG. 4. Alternatively, the length can be 20 ms, 50 ms, or a multiple of 100 ms, such as 200 ms or 300 ms up to 1 second (s) or 1.5 s. Alternatively, the lengths can be equal to or longer than 20 ms, 50 ms or 100 ms or equal to or shorter than 500 ms, 1 s or 1.5 s.

In various embodiments, the selection procedure S can be extended to k independent sensing and selection procedures $S_1$-$S_k$ with each procedure independently sensing and selecting one or more resources in a resource interval and eventually allocating data blocks to the resources in that resource interval. The periodicity for the k procedures is k. That is, every k resource interval, the same resource is selected, and a data block is allocated until reselection for the resource interval.

In various other embodiments, the different and independent sensing and resource selection procedures $S_1$-$S_k$ could be performed during the same resource interval. This is shown in the embodiment of FIG. 5. For example, resources 431 are selected according to a first selection procedure, and resources 433 are selected according to a second selection procedure. The transmissions on the two resources in the same resource interval can be the same data packet and can correspond to different Hybrid Automatic Repeat Request (HARQ) transmissions. Alternatively, the transmissions on the two resources can be different data packets, such as consecutive data packets.

In various embodiments, the reselections of the resources of the first and second resource selection procedures $S_1$ and $S_2$ may be triggered at different times. In various other embodiments, the reselections may be triggered at the same time. In other embodiments, for more than two independent resource selection procedures, some of the procedures trigger the reselection at different times while others trigger the reselection at the same time.

In yet other embodiments, the sensing and resource selection procedures can be performed as a combination of the embodiments of FIGS. 4 and 5.

Figure 6:
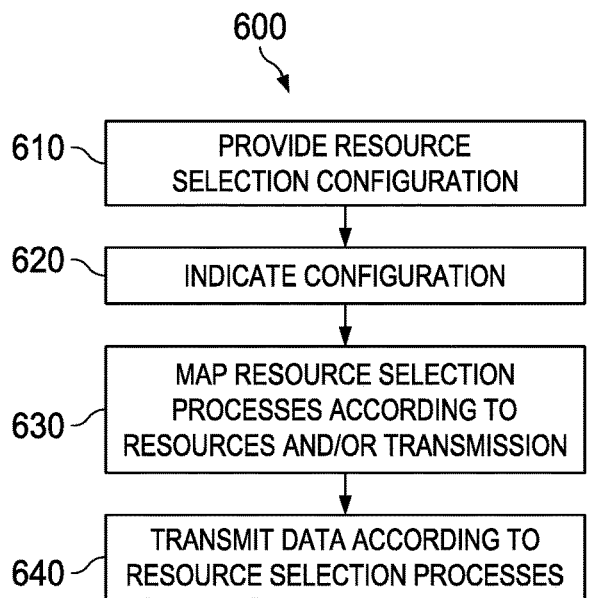
FIG. 6 is a flowchart illustrating an embodiment method for configuring a UE with a number of resource selection processes and for transmitting data according to the number of resource selection processes.

FIG. 6 shows an embodiment method 600 for configuring a UE with a number of resource selection processes and for transmitting data according to at least a subset of the number of resource selection processes. At step 610, a resource selection configuration is provided for a transmitting UE. The UE may provide or obtain a resource selection configuration. This can be done in several ways.

In one option, the UE obtains a number of resource selection processes through a broadcast message from the network, e.g., via the base station or eNB. For instance, the number of resource selection processes may be broadcast in the System Information Block 21 (SIB21), as shown in the text box 700 of FIG. 7. Alternatively, the number of resource selection processes may be broadcast in an equivalent message, such as in a maximum number of resource selection processes field, maxNumberResourceProcesses, or a similar message or field.

In another option, the UE obtains the number of resource selection processes through a dedicated message from the network, base station or eNB, either as a dedicated Radio Resource Control (RRC) message (with a message format similar to the previous option) or as a physical layer message, such as in Downlink Control Information (DCI).

In another option, the UE is preconfigured with a given number of resource selection processes.

In another option, the UE autonomously selects the number of resource selection processes.

The number of resource selection processes may be service-dependent. For instance, for basic V2X safety features, the number of resource selection processes may be one, whereas for platooning services, the number of resource selection processes might be two, three, five, or more. The number of resource selection processes may depend on quality of service (QoS) requirements, reliability requirements, etc.

In an embodiment, a UE may be initialized or configured with the different resource selection processes before an actual transmission can occur. For example, the UE may perform initial resource sensing (for 1 s in V2X Rel-14) and map resource intervals that need to be excluded. The initializing and configuration can be done any time before data is transmitted.

Returning to FIG. 6, at optional step 620, the configuration may be indicated to other network devices. In some cases, an eNB might inform a UE of the selection processes the UE is to use. In some cases, a UE might use control signaling to inform other UEs of the selection processes the UE is using. In various embodiments, there are benefits in having the UE indicate the number of resource selection processes the UE uses and which resource selection is currently used. This can be done in several ways. For example, a new message may be defined to convey this information to other UEs. In other examples, one or more new fields may be added in a Sidelink Control Information (SCI) message. For instance, an index may be associated with each resource selection process. When a transmission occurs for a given resource selection process, the UE may add the corresponding index in the SCI associated with the data transmission.

At step 630, the resource selection procedures are mapped to the resource intervals. The UE may use different resource selection processes for the same or for different consecutive data packet transmissions. Different packet transmissions may be mapped to different resource intervals. For instance, if the transmission periodicity is 100 ms, the UE may use two resource selection processes, $S_1$ and $S_2$, each with a 200 ms periodicity and intertwined as shown in FIG. 4. Odd resource intervals may be allocated to the resource selection procedure $S_1$, and even resource intervals may be allocated to the resource selection procedure $S_2$. Alternatively, each transmission may be allocated two HARQ transmissions in the same resource interval, the first transmission using resources selected in $S_1$ and the second transmission using resources selected in $S_2$. This alternative is shown in FIG. 5.

At step 640, the UE transmits data on the resources that were determined by the resource selection and allocation processes. This step includes transmitting the actual data block on the physical sidelink shared channel (PSSCH) and transmitting the associated Scheduling Assignment (SA), if any, on the physical sidelink control channel (PSCCH). Each sensing and selecting procedure may be performed as described with respect to FIG. 8.

Figure 8:
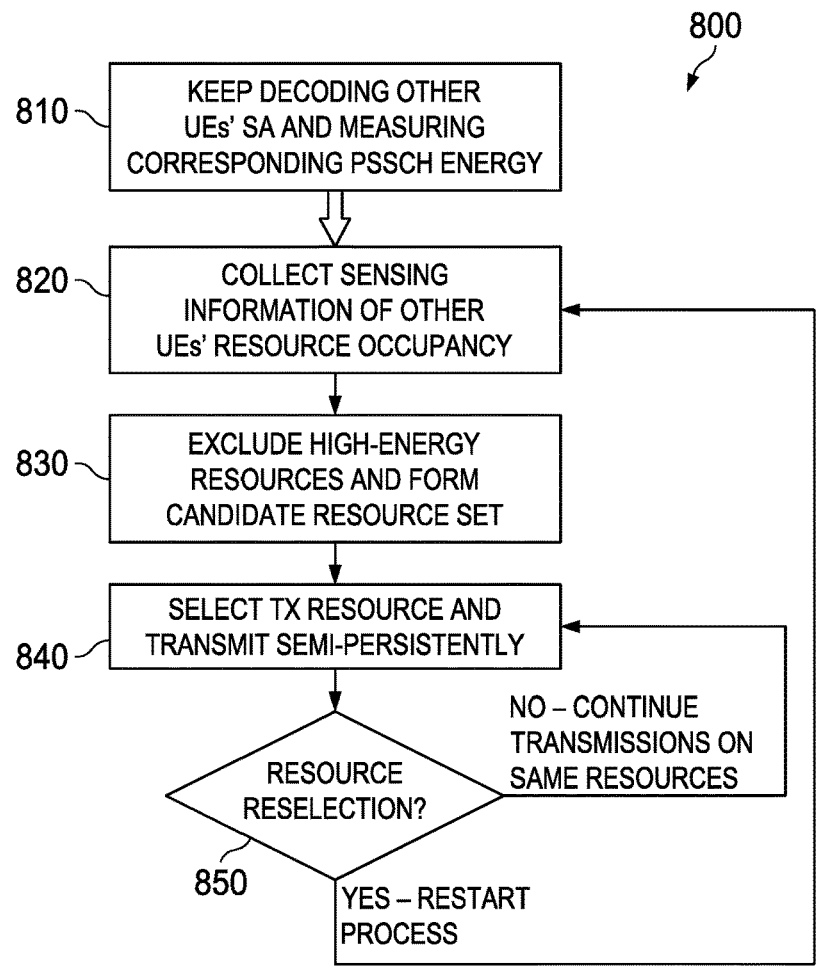
FIG. 8 is a flowchart illustrating an embodiment method for sensing and selecting resources and for transmitting data for a single resource selection process.

FIG. 8 shows a method for sensing and selecting resources and for transmitting data in a single resource selection process 800, such as the selection procedures $S_1$ and $S_2$ described above. In an embodiment, a UE might perform two or more of these resource sensing and selection processes 800 independently and concurrently. Each process 800 might include sensing available resources in a resource pool, selecting and reserving a resource, and transmitting a data block on the selected resource. Alternatively, the sensing procedure of a UE might include the UE sensing the medium for a given duration (about 1 s in Rel-14), the UE identifying and marking some resources as free, and the UE selecting one resource and using the selected resource until reselection is triggered.

At step 810, the UE decodes other UEs' SA and measures the corresponding PSSCH energy. At step 820, the UE collects sensing information of other UEs' resource occupancy by collecting PSSCH energy measurements. At step 830, the UE excludes high energy resources and forms a candidate resource set comprising low energy resources. At step 840, the UE selects a resource for transmitting a data block from the candidate resource set and transmits data blocks semi-persistently on that resource block. At decision block 850, the UE evaluates whether to trigger resource reselection. If no reselection is necessary or desired, the UE continues to transmit data blocks on the selected resource, and the process moves back to step 840. If resource reselection is necessary or desired, a reselection process is triggered, and the process moves back to step 820 in order to determine a new resource to be selected in the resource pool.

Figure 9:
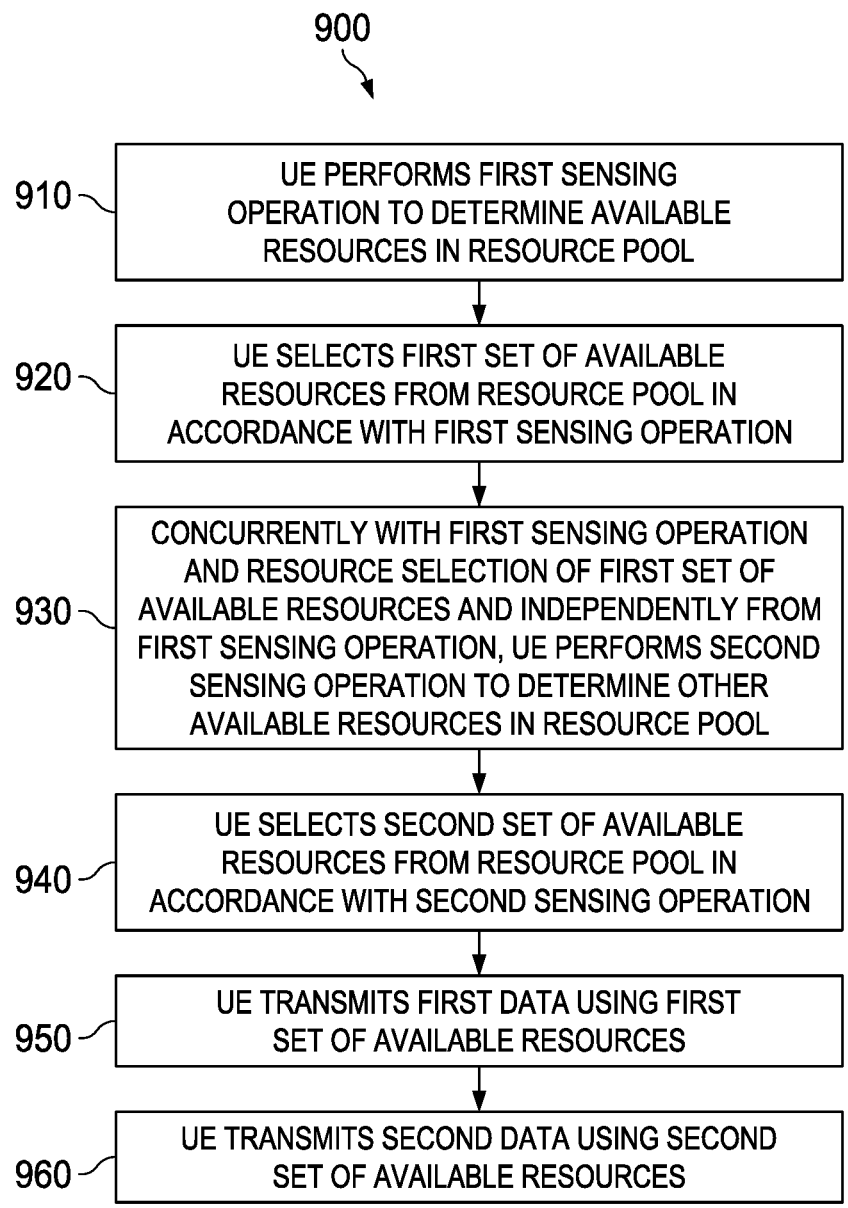
FIG. 9 is a flowchart illustrating an embodiment method for resource selection.

FIG. 9 is a flowchart illustrating an embodiment method 900 for sensing and selecting resources and for transmitting data on the selected resources. At block 910, a UE performs a first sensing operation to determine available resources in a resource pool. At block 920, the UE selects a first set of available resources from the resource pool in accordance with the first sensing operation. At block 930, concurrently with the first sensing operation and resource selection of the first set of available resources and independently from the first sensing operation, the UE performs a second sensing operation to determine other available resources in the resource pool. At block 940, the UE selects a second set of available resources from the resource pool in accordance with the second sensing operation. At block 950, the UE transmits first data using the first set of available resources. At block 960, the UE transmits second data using the second set of available resources. The first data and the second data might be the same data. Alternatively or additionally, the first data and the second data might be two consecutive data packets. The UE might use the first set of available resources and the second set of available resources in alternating time intervals, as in FIG. 4. Alternatively, the UE might use the first set of available resources and the second set of available resources in the same time interval, as in FIG. 5.

Figure 10:
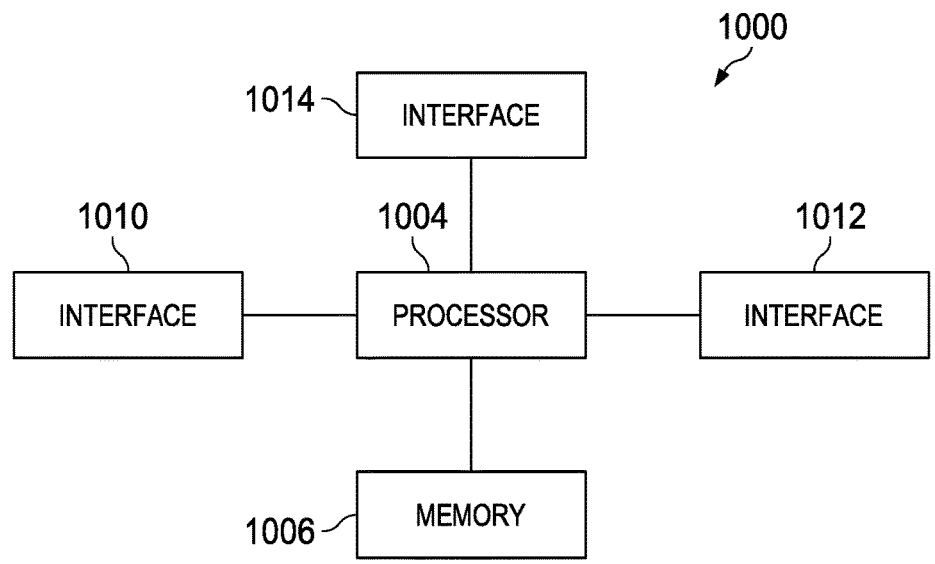
FIG. 10 shows an exemplary embodiment of a processing system.

FIG. 10 is a block diagram illustrating an embodiment processing system 1000 for performing methods described herein, which may be installed in a host device. As shown, the processing system 1000 includes a processor 1004, a memory 1006, and interfaces 1010-1014, which may (or may not) be arranged as shown in the figure. The processor 1004 may be any component or collection of components adapted to perform computations and/or other processing related tasks, and the memory 1006 may be any component or collection of components adapted to store programming and/or instructions for execution by the processor 1004. In an embodiment, the memory 1006 includes a non-transitory computer readable medium. The interfaces 1010, 1012, 1014 may be any component or collection of components that allow the processing system moo to communicate with other devices/components and/or a user. For example, one or more of the interfaces 1010, 1012, 1014 may be adapted to communicate data, control, or management messages from the processor 1004 to applications installed on the host device and/or a remote device. As another example, one or more of the interfaces 1010, 1012, 1014 may be adapted to allow a user or user device (e.g., personal computer (PC), etc.) to interact/communicate with the processing system 1000. The processing system 1000 may include additional components not depicted in the figure, such as long term storage (e.g., non-volatile memory, etc.).

In some embodiments, the processing system woo is included in a network device that is accessing, or part otherwise of, a telecommunications network. In one example, the processing system 1000 is in a network-side device in a wireless or wireline telecommunications network, such as a base station, a relay station, a scheduler, a controller, a gateway, a router, an applications server, or any other device in the telecommunications network. In other embodiments, the processing system woo is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 11:
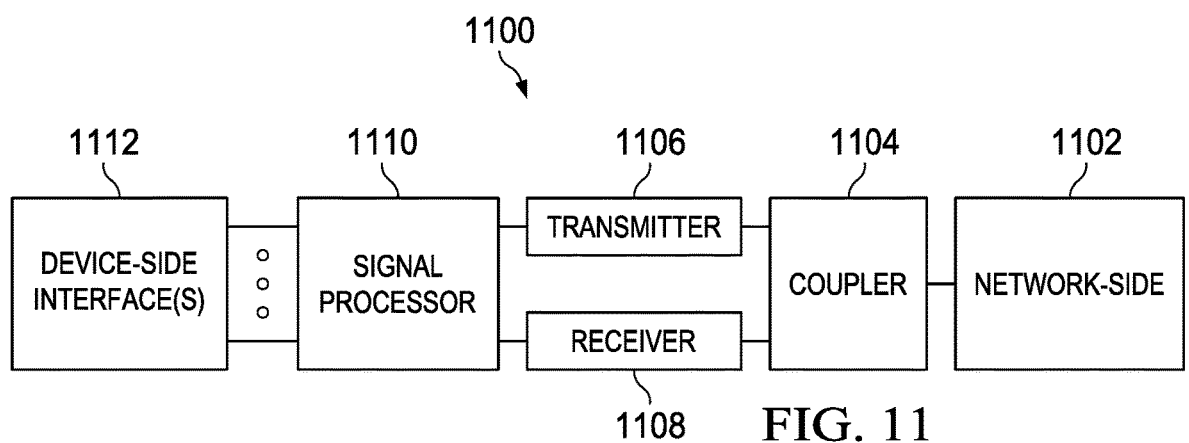
FIG. 11 shows an exemplary embodiment of a transceiver.

In some embodiments, one or more of the interfaces 1010, 1012, 1014 connects the processing system moo to a transceiver adapted to transmit and receive signaling over the telecommunications network. FIG. 11 is a block diagram illustrating a transceiver 1100 adapted to transmit and receive signaling over a telecommunications network. The transceiver 1100 may be installed in a host device. As shown, the transceiver 1100 comprises a network-side interface 1102, a coupler 1104, a transmitter 1106, a receiver 1108, a signal processor 1110, and a device-side interface 1112. The network-side interface 1102 may include any component or collection of components adapted to transmit or receive signaling over a wireless or wireline telecommunications network. The coupler 1104 may include any component or collection of components adapted to facilitate bi-directional communication over the network-side interface 1102. The transmitter 1106 may include any component or collection of components (e.g., up-converter, power amplifier, etc.) adapted to convert a baseband signal into a modulated carrier signal suitable for transmission over the network-side interface 1102. The receiver 1108 may include any component or collection of components (e.g., down-converter, low noise amplifier, etc.) adapted to convert a carrier signal received over the network-side interface 1102 into a baseband signal. The signal processor 1110 may include any component or collection of components adapted to convert a baseband signal into a data signal suitable for communication over the device-side interface(s) 1112, or vice-versa. The device-side interface(s) 1112 may include any component or collection of components adapted to communicate data-signals between the signal processor 1110 and components within the host device (e.g., the processing system 1000, local area network (LAN) ports, etc.).

The transceiver 1100 may transmit and receive signaling over any type of communications medium. In some embodiments, the transceiver 1100 transmits and receives signaling over a wireless medium. For example, the transceiver 1100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1102 comprises one or more antenna/radiating elements. For example, the network-side interface 1102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

At the receiving end, the receiving UE may operate as currently known. In an embodiment, the UE may receive the resource selection process index in the SCI as described above. This may need a new SCI format. Alternatively, some of the currently reserved bits of SCI format 1 may be used to indicate the resource selection process index, and/or the maximum number of resource selection processes. A receiving UE may benefit from decoding this information.

At the network, base station or eNB, depending on the embodiment, some changes may be needed. In an embodiment, if the number or maximum number of resource selection processes is broadcast by the network, base station or eNB, a new field may be needed in SIB21 or a similar message. If dedicated RRC signaling is used, a new information element, or a new field in an information element may be needed. Alternatively, if the resource selection process management is fully under the control of the transmitting UE, no change at the network, base station or eNB is needed.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for resource selection, the method comprising:
concurrently performing, by a user equipment (UE), both a first sidelink sensing operation to identify a first set of available resources in a resource pool and a second sidelink sensing operation to identify a second set of available resources in the resource pool, the second set of available resources configured for sidelink resource re-selection from the first set of available resources by the UE, wherein the second sidelink sensing operation is performed independently from the first sidelink sensing operation; and
sending, by the UE, a first data transmission over the first set of available resources and a second data transmission over the second set of available resources.

2. The method according to claim 1, wherein the first data transmission and the second data transmission carry the same data packet.

3. The method according to claim 1, wherein the first data transmission and the second data transmission carry two consecutive data packets in the same encoded traffic stream.

4. The method according to claim 1, wherein the first set of available resources and the second set of available resources are on different subframes.

5. The method according to claim 1, wherein the first set of available resources are interleaved with the second set of available resources over a sequence of resource intervals in the time domain.

6. The method according to claim 1, wherein the first set of available resources and the second set of available resources are in the same resource interval or the same set of resource intervals in the time domain.

7. The method according to claim 1, wherein selection of the first set of available resources and selection of the second set of available resources are performed before a reselection of resources.

8. The method according to claim 7, wherein resource reselections for the first set of available resources and the second set of available resources occur at different times.

9. The method according to claim 1, wherein the first set of available resources and the second set of available resources are in consecutive data blocks.

10. The method according to claim 1, further comprising:
concurrently performing, by the UE along with the first sidelink sensing operation and the second sidelink sensing operation, a third sidelink sensing operation to identify a third set of available resources in the resource pool, the third sidelink sensing operation being performed independently from both the first sidelink sensing operation and the second sidelink sensing operation; and
sending, by the UE, a third data transmission over the third set of available resources.

11. A user equipment (UE) comprising:
a non-transitory memory storage comprising instructions; and
one or more processors in communication with the memory storage, wherein the one or more processors execute the instructions to:
concurrently perform both a first sidelink sensing operation to identify a first set of available resources in a resource pool and a second sidelink sensing operation to identify a second set of available resources in the resource pool, the second set of available resources configured for sidelink resource re-selection from the first set of available resources by the UE, wherein the second sidelink sensing operation being performed independently from the first sensing sidelink operation; and
send a first data transmission over the first set of available resources and a second data transmission over the second set of available resources.

12. The UE according to claim 11, wherein the first data transmission and the second data transmission carry the same data packet.

13. The UE according to claim 11, wherein the first data transmission and the second data transmission carry two consecutive data packets in the same encoded traffic stream.

14. The UE according to claim 11, wherein the first set of available resources and the second set of available resources are on different subframes.

15. The UE according to claim 11, wherein the first set of available resources are interleaved with the second set of available resources over a sequence of resource intervals in the time domain.

16. The UE according to claim 11, wherein the first set of available resources and the second set of available resources are in the same resource interval or the same set of resource intervals in the time domain.

17. The UE according to claim 11, wherein selection of the first set of available resources and selection of the second set of available resources are performed before a reselection of resources.

18. The UE according to claim 17, wherein resource reselections for the first set of available resources and the second set of available resources occur at different times.

19. The UE according to claim 11 wherein the first set of available resources and the second set of available resources are in consecutive data blocks.

20. The UE according to claim 11, wherein the programming further includes instructions to:
concurrently perform, along with the first sidelink sensing operation and the second sidelink sensing operation, a third sidelink sensing operation to identify a third set of available resources in the resource pool, the third sidelink sensing operation being performed independently from both the first sidelink sensing operation and the second sidelink sensing operation; and
send, by the UE, a third data transmission over the third set of available resources.

21. A method for resource selection, the method comprising:

concurrently performing, by a user equipment (UE), a first sidelink sensing operation to identify a first set of available resources in a first resource pool and a second sidelink sensing operation to identify a second set of available resources in a second resource pool, the second set of available resources configured for sidelink resource re-selection from the first set of available resources by the UE, wherein the second sidelink sensing operation is independent from the first sidelink sensing operation; and sending, by the UE, a first sidelink data transmission over the first set of available resources and a second sidelink data transmission over the second set of available resources.

22. The method according to claim 21, wherein the second sidelink data transmission is a re-transmission of the first sidelink data transmission.

23. The method according to claim 21, wherein the first sidelink data transmission and the second sidelink data transmission carry two consecutive data packets in the same encoded traffic stream.

\* \* \* \* \*